US006616560B2

(12) United States Patent
Hayabuchi et al.

(10) Patent No.: US 6,616,560 B2
(45) Date of Patent: Sep. 9, 2003

(54) SHIFT CONTROL APPARATUS FOR AUTOMATIC TRANSMISSION

(75) Inventors: Masahiro Hayabuchi, Anjo (JP);
Masaaki Nishida, Anjo (JP); Hiroshi Tsutsui, Anjo (JP); Kouichi Kojima, Anjo (JP); Yutaka Teraoka, Anjo (JP); Nobuhiro Iwai, Anjo (JP); Masatake Ichikawa, Anjo (JP)

(73) Assignee: Aisin AW Co., Ltd., Anjo (JP)

( * ) Notice: Subject to any disclaimer, the term of this patent is extended or adjusted under 35 U.S.C. 154(b) by 0 days.

(21) Appl. No.: 10/015,608

(22) Filed: Dec. 17, 2001

(65) Prior Publication Data

US 2002/0086760 A1 Jul. 4, 2002

(30) Foreign Application Priority Data

Dec. 28, 2000 (JP) ........................................ 2000-399871

(51) Int. Cl.[7] .............................................. F16H 31/00
(52) U.S. Cl. .......................... 475/116; 475/127; 477/143
(58) Field of Search ................................ 475/116, 127, 475/128, 121; 477/143, 144, 155, 149

(56) References Cited

U.S. PATENT DOCUMENTS

| 4,989,477 | A | * | 2/1991 | Hunter et al. ............... 477/148 |
| 5,097,726 | A | * | 3/1992 | Asada ........................ 477/121 |
| 5,115,696 | A | * | 5/1992 | Takada et al. ............... 475/116 |
| 5,304,102 | A | * | 4/1994 | Narita et al. ................ 475/125 |
| 5,573,478 | A | * | 11/1996 | Tsukamoto et al. .......... 477/130 |
| 5,720,694 | A | * | 2/1998 | Jang ........................... 477/116 |
| 5,779,585 | A | * | 7/1998 | Tsukamoto et al. .......... 475/128 |
| 5,810,692 | A | * | 9/1998 | Takiguchi et al. ........... 477/144 |
| 5,865,707 | A | * | 2/1999 | Shimada et al. .............. 477/44 |
| 5,888,170 | A | * | 3/1999 | Takiguchi et al. ........... 477/146 |
| 6,102,830 | A | * | 8/2000 | Tsutsui et al. ............... 477/143 |
| 6,270,444 | B1 | * | 8/2001 | Tsutsui et al. ............... 477/143 |

FOREIGN PATENT DOCUMENTS

| JP | A 4-219553 | 8/1992 |
| JP | A 5-315898 | 11/1993 |
| JP | A 6-270444 | 9/1994 |

* cited by examiner

*Primary Examiner*—Rodney H. Bonck
*Assistant Examiner*—David D. Le
(74) *Attorney, Agent, or Firm*—Oliff & Berridge, PLC

(57) ABSTRACT

A shift control apparatus that advances activation of an engagement element to be engaged during a shift requiring engagement and release of four engagement elements, thereby reducing the shift time. The automatic transmission achieves a sixth-to-fourth-to-third shift by controlling servo pressures for the four engagement elements. The control apparatus starts, at the time of the sixth-to-third shift, supply of the hydraulic pressure for activating the engagement element to be engaged at the time of the fourth-to-third shift, thereby advancing the establishment of the engagement stand-by state at the time of the fourth-to-third shift. Accordingly, the reduction in the servo pressure of the engagement element to be released at the time of the fourth-to-third shift can be advanced, thereby reducing the time for the sixth-to-third shift.

19 Claims, 11 Drawing Sheets

|  | C-1 | C-2 | C-3 | B-1 | B-2 | B-3 | F-1 | F-2 |
|---|---|---|---|---|---|---|---|---|
| P |  |  |  |  |  |  |  |  |
| R |  |  | ○ |  |  | ○ |  |  |
| N |  |  |  |  |  |  |  |  |
| 1st | ○ |  |  |  |  | △ |  | ○ |
| 2nd | ○ |  |  | △ | ○ |  | ○ |  |
| 3rd | ○ |  | ○ |  | ● |  |  |  |
| 4th | ○ | ○ |  |  | ● |  |  |  |
| 5th |  | ○ | ○ |  | ● |  |  |  |
| 6th |  | ○ |  | ○ | ● |  |  |  |

SHIFT CONTROL APPARATUS FOR AUTOMATIC TRANSMISSION

BACKGROUND OF THE INVENTION

1. Field of Invention

The invention relates to a shift control apparatus for an automatic transmission and, more particularly, to an art for quickening a shift requiring release and engagement of two each of different engagement elements between gear speeds, i.e., simultaneous changeover of two elements.

2. Description of Related Art

An automatic transmission, as well known, achieves a plurality of gear speeds due to the change of a gear ratio by switching a power transmission path through shift elements constituted by a planetary gear, by means of engagement and release of frictional engagement elements. In an effort to perform engagement and release of the engagement elements during the shift with an as-simple-as possible hydraulic control while preventing the generation of transmission shock, generally, an operation of the engagement elements for a shift-up/down is based on additionally engaging another engagement element or releasing one of the engagement elements that are engaged with respect to a plurality of or single engagement element(s) in an engaged state, in order to achieve a predetermined gear speed. A so called changeover of the engagement elements comprises releasing one engagement element that is engaged while engaging another engagement element, in a case in which it is absolutely necessary because of the structure of the gear train.

Meanwhile, there has been a trend for automatic transmissions to be multi-speed so as to match the improved drivability and because of demands for improved energy conservation by reducing fuel consumption. The multi-speed automatic transmission is generally realized in an embodiment where an acceleration or deceleration speed, assisted by an overdrive or underdrive gear, is added to a transmission mechanism constituted by a planetary gear set for multiple speeds. However, another embodiment, as disclosed in Japanese Patent Application Laid Open No. 4-219553, achieves multiple speeds by setting two systems, a high and a low, of input to a Ravigneaux type planetary gear set.

The aforementioned gear train with multi-speed offers a wider choice of options for the gear speed matched to a running condition of a vehicle. Therefore, a changeover operation of the engagement elements requires not only a simple changeover of two elements, but also a complicated changeover of four elements. An example that requires the changeover of the four elements is a so called jump shift in which the shifting is suddenly made to a predetermined gear speed among a plurality of gear speeds. In any case, where this kind of multiple changeover of the four elements is performed, how to control the order and the timing of the engagement and release of each engagement is an important issue. If the control is not appropriate, smooth progress of the shift in the transmission mechanism is hindered and continuity in the shifting is lost. Accordingly, problems are caused, such as a step-like shock is generated during the shift, shock at the completion of the transmission becomes very large, or a longer time than necessary is required for the shift.

SUMMARY OF THE INVENTION

Therefore, it is an object of the invention to provide a shift control apparatus for an automatic transmission that prevents the period of shift from extending by quickening the progress of the shift at the time of shift that requires engagement and release of the four engagement elements. It is a further object of the invention to quicken the progress of the shift at the latter half after passing the intermediate speed when the shifting shifts through the intermediate speed.

BRIEF DESCRIPTION OF THE DRAWINGS

The invention will be described with reference to the drawings, in which.

DETAILED DESCRIPTION OF PREFERRED EMBODIMENTS

Figure 1:
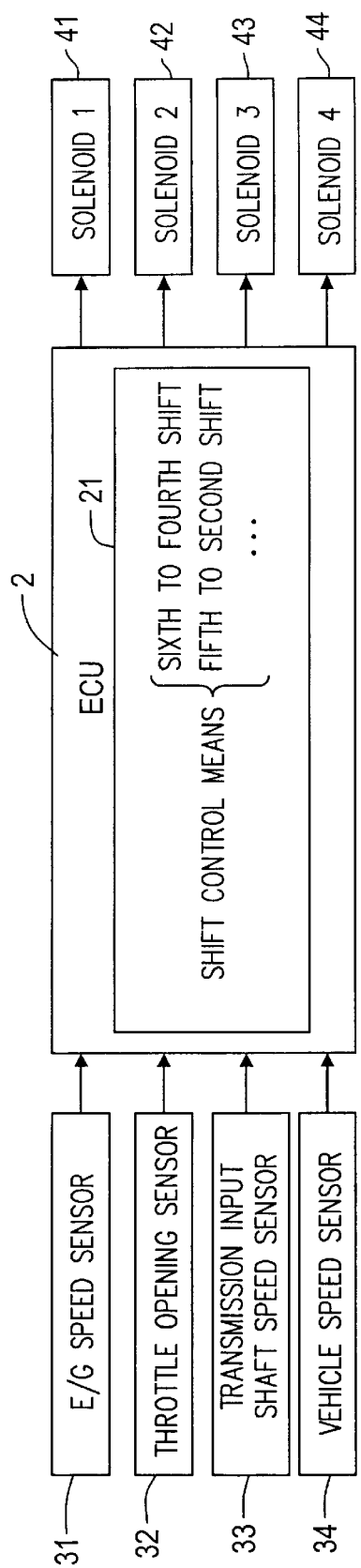
FIG. 1 is a block diagram showing a system configuration for the signal system for the control apparatus of the automatic transmission according to the embodiment of the invention.
Figure 5:
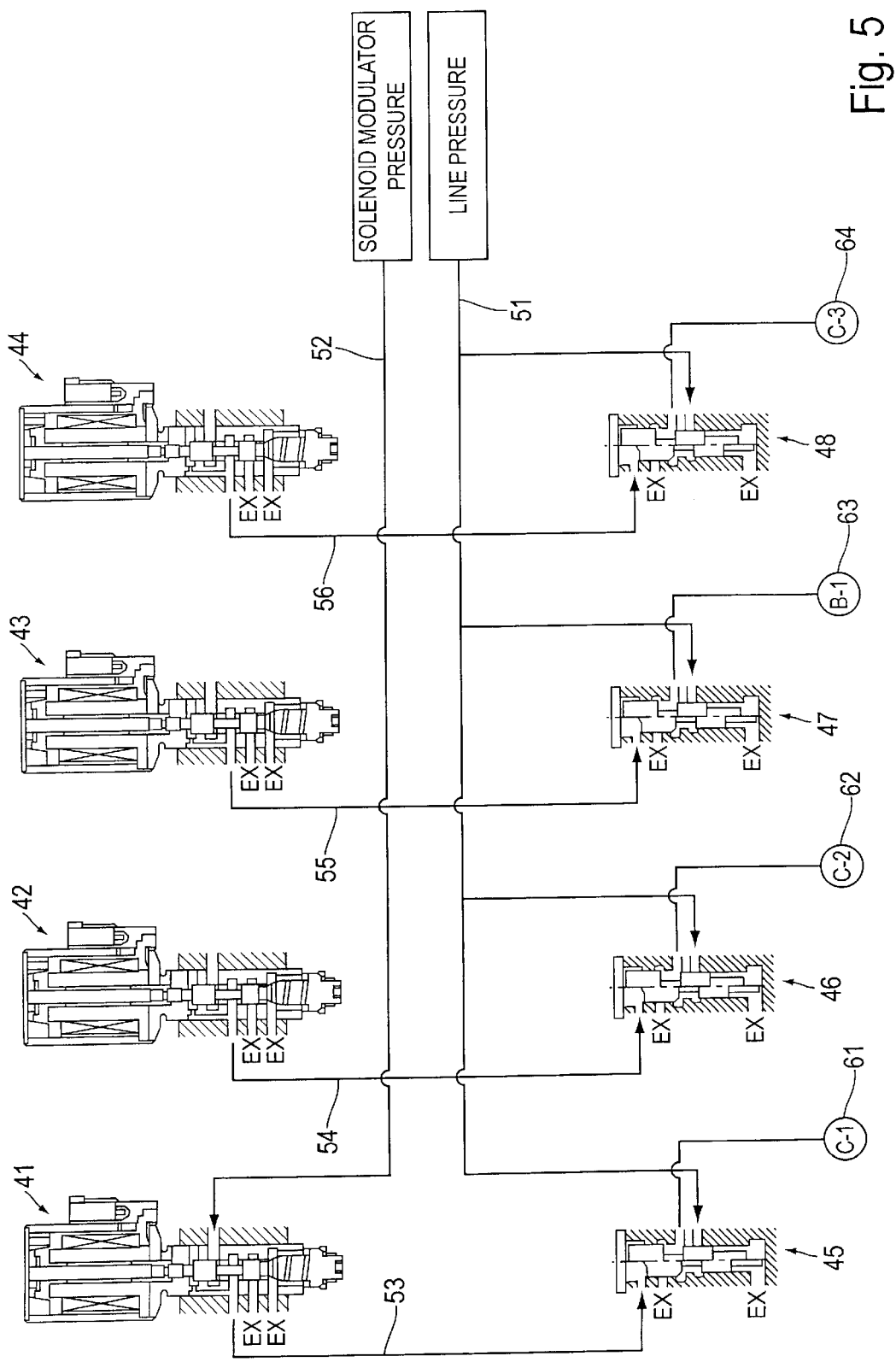
FIG. 5 is a hydraulic circuit chart of the operation system of the control apparatus.

Hereinafter, referring to the drawings, an embodiment of the invention will be explained. FIG. 1 is a block diagram of a system configuration of a signal system in a control apparatus of an automatic transmission. As shown in the figure, the control apparatus is provided with an electronic control unit (ECU) 2 which serves as the core of the control apparatus, various sensors as input means for inputting various information to the electronic control unit, such as an engine (E/G) speed sensor 31 for detecting an engine speed of a vehicle, a throttle opening sensor 32 for detecting an engine load, a transmission input shaft speed sensor 33 for detecting an input speed of the transmission, and a vehicle speed sensor 34 for detecting a vehicle speed from the output shaft revolution of the transmission. The control apparatus is also structured with a plurality of solenoids as output means that operate by the output of a drive signal based on the control information, that is, solenoids 1 to 4 as actuators for respective solenoid valves 41 to 44 disposed in a hydraulic control apparatus that will be described later with reference to FIG. 5.

Figure 2:
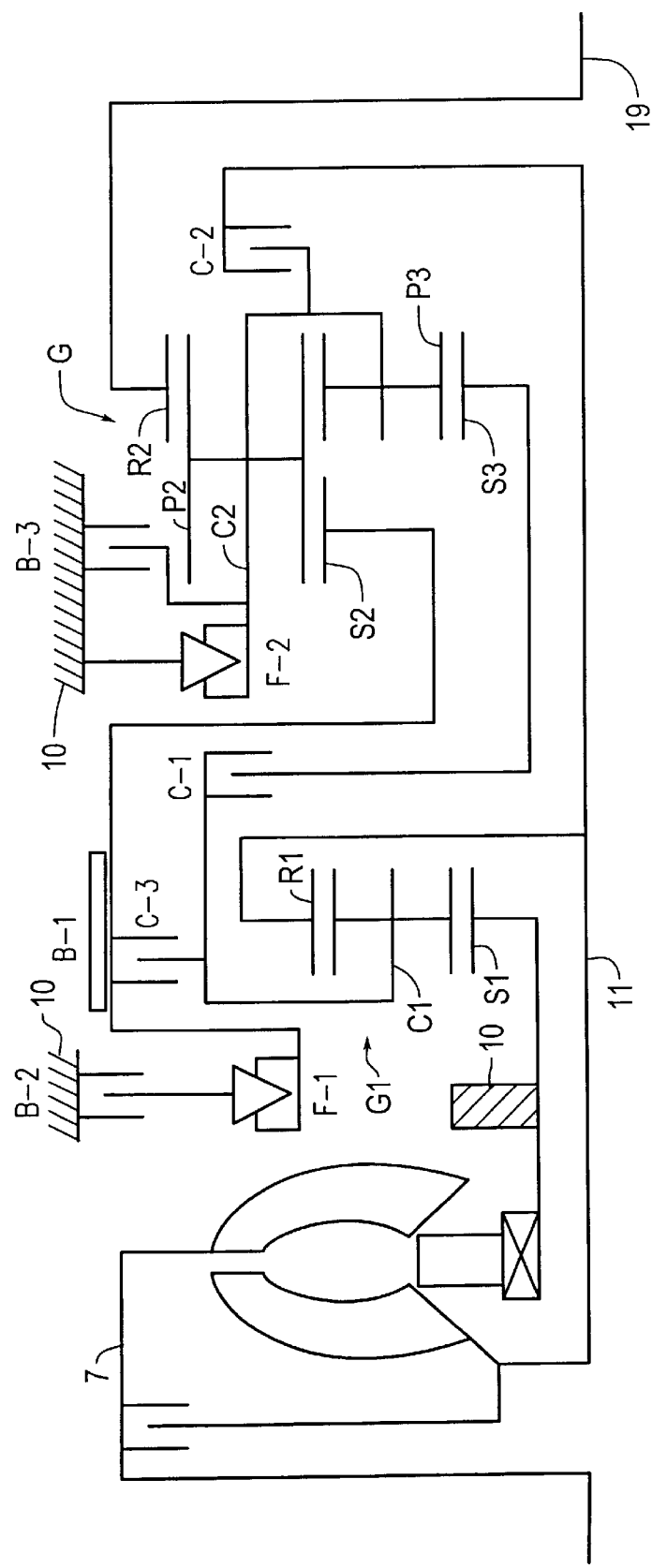
FIG. 2 is a schematic diagram of the gear train of the automatic transmission.

FIG. 2 is a skeleton diagram of a 6-speed gear train for a front-drive, rear-wheel vehicle, as an example of the transmission mechanism controlled by the aforementioned control apparatus. The gear train is constructed of a torque converter 7 with a lock-up clutch and a transmission mechanism with six forward speeds and one reverse speed made by a combination of a Ravigneaux type planetary gear set G and a simple planetary type deceleration gear G1.

The planetary gear set G that constitutes the main body of the transmission mechanism is a Ravigneaux type gear set including two sun gears S2, S3 with different diameters, a ring gear R2, a long pinion gear P2 that is externally meshed with the larger diameter sun gear S2 and internally meshed with the smaller diameter sun gear S3, a short pinion gear P3 that is externally meshed with the smaller diameter sun gear S3 and the long pinion gear P2, and a carrier C2 supporting both pinion gears P2, P3. The smaller diameter sun gear S3 of the planetary gear set G is connected to a multi-disc structured clutch (C-1). Hereafter, the abbreviation symbol for each engagement element is stated before the engagement element frame. The larger diameter sun gear S2 is connected to a multi-disc structured C-3 clutch and its rotation is controlled by means of a B-1 brake, which is a band brake, in conjunction with an automatic transmission case 10. The larger diameter sun gear S2 rotation is further controlled by means of an F-1 one-way clutch, in conjunction with the automatic transmission case 10, and a B-2 brake that are in parallel with the B-1 brake. In addition, the carrier C2 is connected to an input shaft 11 by a C-2 clutch, a multi-disc structured engagement element, and its rotation controlled by means of a multi-disc structured B-3 brake in conjunction with the automatic transmission case 10. Further control of rotation of the carrier C2 and the ability to rotate in one direction is with the transmission case 10 by means of an F-2 one way clutch F2. In addition, the ring gear R2 is connected to an output shaft 19. Controlled as used throughout the specification indicates a degree of engagement to include complete engagement, which in the case of braking means fully stopped or for a one-way clutch may limit rotation to a single direction.

The deceleration planetary gear G1 is structured by a simple planetary gear, in which a ring gear R1 is the input element and is connected to the input shaft 11. In addition, a carrier C1 is the output element and is connected to the smaller diameter sun gear S3 through the C-1 clutch and is connected to the larger diameter sun gear S2 through the C-3 clutch. A sun gear S1, as the fixed element for removing the reaction force, is secured to the transmission case 10.

Figures 3, 4:
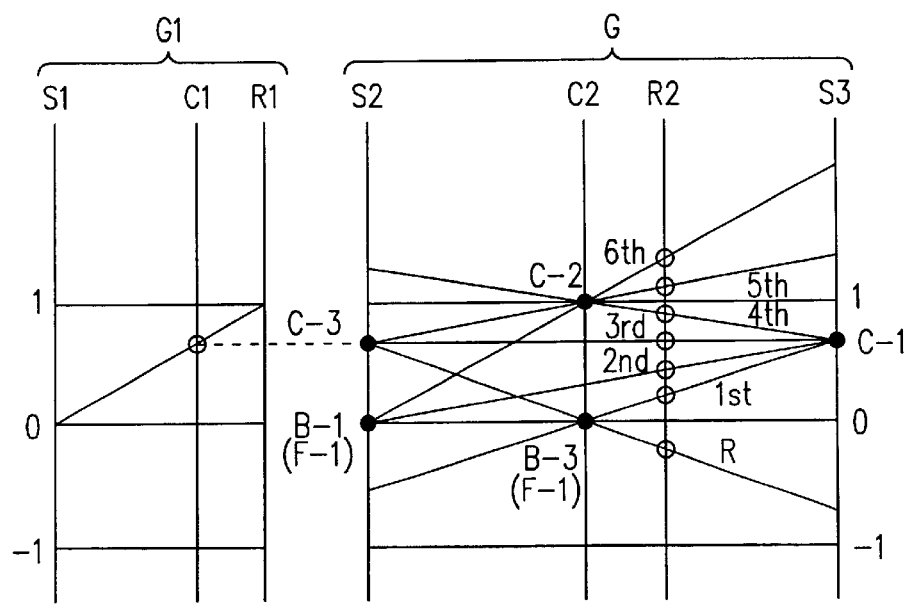
FIG. 3 is an engagement chart showing the engagement and release relationship of each gear speed achieved by the gear train and each engagement element.
FIG. 4 is a speed diagram of the gear train.

With the automatic transmission, a relationship between each engagement element, that is, a relationship between the engagement and release of clutches, brakes and one-way clutches and the gear speeds achieved is shown in the engagement chart of FIG. 3. In the engagement chart, a ○ mark refers to engagement, no mark refers to release, a Δ mark refers to an engagement for achieving engine braking, and a · mark refers to an engagement that does not directly act to achieve a gear speed. Further, FIG. 4 is a speed diagram showing the relationship of the gear speed achieved by the engagement of each clutch, brake and one-way clutch (with a · mark referring to engagement thereof) and the speed ratio of the revolution of each transmission element at that time.

As evident by referring to both figures, a first speed (1st) is achieved by the engagement of the C-1 clutch and the B-3 brake. In this embodiment, however, as is evident from the operation chart, in place of the engagement of the B-3 brake, an engagement of the F-2 one-way clutch is used. The reason why this engagement is used and why this engagement corresponds to the engagement of the B-3 brake is to avoid a complicated hydraulic control for changeover between the B-3 brake and the B-1 brake during the shift from the first speed to the second speed, to be described later in detail, and to simplify release control of the B-3 brake. Therefore, the F-2 one way clutch is used that releases the engagement force by itself in accordance with the engagement of the B-1 brake, and the engagement is equivalent to the engagement of the B-3 brake. In this case, revolution decelerated from the input shaft 11 through the deceleration planetary gear G1 is input to the smaller diameter sun gear S3 through the C-1 clutch, reaction force is taken from the carrier C2 controlled by the engagement of the F-2 one-way clutch, and the decelerated revolution of the ring gear R2 at the maximum deceleration ratio is output to the output shaft 19.

Next, the second speed (2nd) is achieved by the engagement of the F-1 one-way clutch corresponding to the engagements of the C-1 clutch and the B-1 brake and by the engagement of the B-2 brake that makes the engagement of the F-1 one-way clutch effective. The reason why these engagements correspond to the engagement of the B-1 brake will be explained in detail later. In this case, revolution decelerated from the input shaft 11 through the deceleration planetary gear G1 is input to the smaller diameter sun gear S3 through the C-1 clutch, reaction force is taken out from the larger diameter sun gear S2 controlled by the engagement of the B-2 brake and the F-1 one-way clutch, and the decelerated revolution of the ring gear R2 is output to the output shaft 19. The deceleration ratio at this time is smaller than that at first speed (1st) as shown in FIG. 4.

Further, third speed (3rd) is achieved by the engagements of the C-1 clutch and the C-3 clutch at the same time. In this case, a revolution decelerated from the input shaft 11 through the deceleration planetary gear G1 is input to the larger diameter sun gear S3 and the smaller diameter sun gear S2 at the same time through the C-1 clutch and the C-3 clutch. This causes the planetary gear set G to be in a directly connected state. Therefore, the revolution of the ring gear R2, which is equal to input speed to both sun gears, is output to the output shaft 19 as the decelerated revolution with respect to the revolution of the input shaft 11.

Further, the fourth speed (4th) is achieved by the engagements of the C-1 clutch and the C-2 clutch at the same time. In this case, on one hand, the revolution decelerated from the input shaft 11 through the deceleration planetary gear G1 is input to the smaller diameter sun gear S3 through the C-1 clutch and, on the other hand, non-decelerated revolution input from the input shaft 11 through the C-2 clutch is input to the carrier C2. The intermediate revolution of the two input speeds is output to the output shaft 19 as the revolution of the ring gear R2 slightly decelerated with respect to the revolution of the input shaft 11.

Next, the fifth speed (5th) is achieved by the engagements of the C-2 clutch and the C-3 clutch at the same time. In this case, on one hand, revolution decelerated from the input shaft 11 through the deceleration planetary gear G1 is input to the larger diameter sun gear S2 through the C-3 clutch and, on the other hand, non-decelerated revolution input from the input shaft 11 through the C-2 clutch is input to the carrier C2. Accordingly, slightly accelerated revolution, with respect to the revolution of the input shaft 11, of the ring gear R2 is output to the output shaft 19.

Further, sixth speed (6th) is achieved by the engagements of the C-2 clutch and the B-1 brake. In this case, non-decelerated revolution is input from the input shaft 11 through the C-2 clutch only to the carrier C2, reaction force is taken out from the sun gear S2 controlled by the engagement of the B-1 brake, and a further accelerated revolution of the ring gear R2 is output to the output shaft 19.

In addition, a reverse speed (R) is achieved by the engagements of the C-3 clutch and the B-3 brake. In this case, the revolution decelerated from the input shaft 11 through the deceleration planetary gear G1 is input to the larger diameter sun gear S2 through the C-3 clutch, reaction force is taken out from the carrier C2 controlled by the engagement of the B-3 brake, and a reverse rotation of the ring gear R2 is output to the output shaft 19.

Now, the aforementioned relationship between the F-1 one-way clutch and both B-1 and B-2 brakes will be explained. In this case, the F-1 one-way clutch is able to perform a function substantially equivalent to the engagement of the B-1 brake by setting the engagement direction of the F-1 one-way clutch connected to the sun gear S2 to be aligned in the direction in which the larger diameter sun gear S2 supports the reaction force torque at the second speed. However, unlike the carrier C2, the larger diameter sun gear S2 is an engagement element that is not only engaged for obtaining an engine brake effect at the second speed but also is controlled for achieving sixth speed. Therefore, the B-1 brake becomes necessary. Further, as apparent from the speed diagram in FIG. 4, the larger diameter sun gear S2 rotates in the reverse direction with respect to the input speed direction when the first speed (1st) is achieved, but it rotates in the same direction with respect to the input speed direction for achieving the third or higher speeds. Because the F-1 one way clutch cannot be directly connected to a fixed member, it is structured such that the effectiveness of the engaged state is controllable by the series arrangement with the B-2 brake.

Each gear speed above is achieved having a good speed step at relatively equal intervals with respect to each gear speed as quantitatively understood by referring to the intervals in the vertical direction shown by the ○ mark that indicates the speed ratio of the ring gear R2. The gear train does not require multiple changeovers of the engagement elements for ordinary up/down shifts between adjacent gear speeds but does require it in jumping shifts. The down shifts in which there is a particular necessity to jump shifts are the sixth-to-third jumping shift and the fifth-to-second jumping shift. However, in the fifth-to-second jumping shift, the B-2 brake is always engaged at the second or higher speed for the purpose of simplifying the control. Accordingly, an automatic engagement of the F-1 one-way clutch plays the role of the engagement of the B-1 brake.

A hydraulic control apparatus, for controlling the transmission mechanism as above structured by operating a hydraulic servo for each clutch and brake, is structured such that the hydraulic servo for each engagement element is independently and directly controlled by its own solenoid valve by means of a solenoid drive signal from the electronic control unit 2. In the hydraulic circuit as shown in the circuit configuration in FIG. 5, each control valve 45 to 48 is connected in parallel to a line pressure oil path 51 connected to a supply circuit, which is shown by a block with the specific configuration omitted, for the line pressure, the maximum circuit pressure that can keep each engagement element in an engaged state in accordance with vehicle driving load. Further, each control valve operates while regulating a pressure in accordance with a solenoid pressure applied from a corresponding solenoid valve 41 to 44.

More particularly, a hydraulic servo 61 for the C-1 clutch is connected to the line pressure oil path 51 through the C-1 control valve 45, and a spool end of the C-1 control valve 45 is connected through the solenoid valve 41 to a solenoid modulator hydraulic oil path 52. The solenoid modulator pressure refers to a hydraulic pressure obtained by decreasing the line pressure through the modulator valve in order to increase the pressure adjustment gain by the solenoid valve. The C-1 control valve 45, formed as a spool valve provided with lands having different diameters at both ends, is structured such that, by applying a solenoid signal pressure to the larger diameter land end against the spring load applied to the smaller diameter land end, a drain port is closed at the larger diameter land, and a gap between an in-port arranged along the line pressure oil path 51 and an out-port arranged along the hydraulic servo 61 is throttled by the smaller diameter land so that the line pressure oil path 51 is communicated with the hydraulic servo 61. Then, the in-port is closed with the smaller diameter land by releasing the solenoid pressure, and the drain port is opened with the larger diameter land so that the hydraulic servo 61 is drain connected.

On the other hand, the solenoid valve 41, formed as a linear solenoid valve that is always open, is structured to regulate the throttling between the solenoid modulator pressure oil path 52 and a solenoid pressure oil path 53 by a load applied to a plunger against the spring load applied to one end of the spool having lands at both ends thereof. The solenoid valve 41 is also structured to adjust the solenoid pressure by adjusting the drain amount of the solenoid pressure oil path 53. For the C-2 clutch, B-1 brake, and the C-3 clutch, the same parallel circuit configuration is employed, respectively, by control valves 46, 47, 48, solenoid valves 42, 43, 44, and solenoid pressure oil paths 54, 55, 56 connecting therebetween.

An automatic transmission with such a structure, for example in a case where a first gear speed is set at the sixth speed, requires operation of four engagement elements (C-1 clutch, C-2 clutch, C-3 clutch, and B-1 brake) during a sixth to third shift in which third speed, that is separated from sixth speed by three speeds, is made a second gear speed. In this case, the first gear speed (sixth speed) is achieved by the engagement of the first and second engagement elements (B-1 brake and C-2 clutch), and the second gear speed is achieved by the engagement of the third and fourth engagements elements (C-1 clutch and C-3 clutch). In addition, when the first gear speed is the fifth speed, the operation of four engagement elements (C-1 clutch, C-2 clutch, C-3 clutch, and F-1 one-way clutch) is also required for the shift from fifth speed to second speed which is separated by two speeds as the B-2 brake is already engaged. In this case, the first engagement element is the C-2 clutch, the second engagement element is the C-3 clutch, the third engagement element is the C-1 clutch, and the fourth engagement element is the F-1 one-way clutch and the already engaged B-2 brake. However, in this automatic transmission, a fifth to second speed shift does not require operation of four engagement elements because the B-2 brake has been in the engaged state from the beginning of the shift for the reason aforementioned, and the F-1 one-way clutch is an automatic engagement element.

Therefore, in preparation for the shift while controlling four elements during a shift from sixth to third speed, the shift control apparatus according to the invention is provided with shift control means 21 (see FIG. 1) for starting the engagement control including that of the activation of the C-3 clutch as the fourth engagement element after the start of the engagement control including that of activation of the C-1 clutch as the third engagement element and before the start of the engagement of the C-1 clutch.

Activation of each engagement element herein refers to the start operation for each engagement element. In addition, release or engagement herein includes a transient slipping state leading to a complete release or complete engagement. Therefore, start of the release refers to the start of slipping of an engagement element. Regarding an engagement element for which release is operated by hydraulic pressure, start of release refers to the start of slipping due to a decrease in the engagement force. In a similar way, completion of engagement refers to slipping due to an increase in the engagement force. Accordingly, completion of engagement, in the case of an engagement element operated by the hydraulic pressure, refers to the elimination of slipping due to an increase in the engagement force.

Further, in this embodiment, the shift control means 21 sets, with respect to the first gear speed (sixth speed) and the second gear speed (third speed), a transient gear speed (fourth speed), in which operation of two engagement elements (C-1 clutch, B-1 brake), among four engagement elements, is required, and in which the second gear speed (third speed) is achieved by operation of the other two engagement elements, and moves the shift from the first gear speed (sixth speed) to the second gear speed (third speed), through a shift from the first gear speed (sixth speed) to the transient gear speed (fourth speed), to a shift from the transient gear speed (fourth speed) to the second gear speed (third speed). In this case, the four engagement elements are the C-1 clutch, which is engaged during shifting to the transient gear speed (fourth speed), the B-1 brake, which is released during shifting to the transient gear speed, the C-3 clutch, which is engaged during shifting to the second gear speed (third speed), and the C-2 clutch, which is released during shifting the second gear speed (third speed).

Next, a specific structure of the shift control means 21 will be explained. The shift control means 21 is configured as a program in the control apparatus, and controls the hydraulic servos 61 to 64 for each engagement element by operation of the corresponding solenoid valve 41–44 by a solenoid drive signal output based on the program to perform the shifting. Next, a control flow of the shift control means 21 will be explained for each engagement element.

Figure 6:
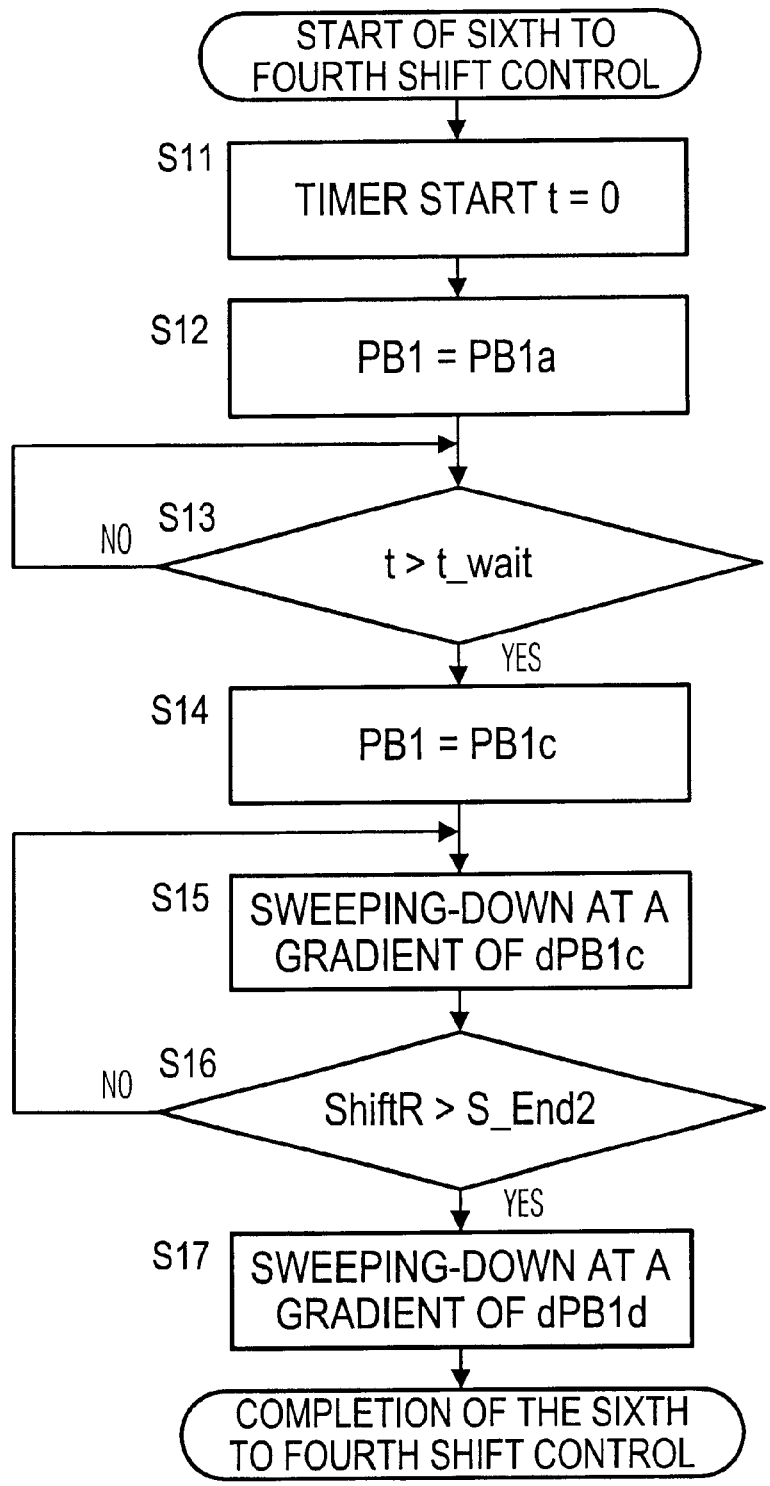
FIG. 6 is a flow chart showing the release control of the B-1 brake at the time of the sixth to third shift.

First, a control flow for releasing the B-1 brake as the first engagement element to be released in this shifting will be described with reference to FIG. 6. In this control, first, a timer for judging the degree of the progress of the shift is started in Step S11 (Timer start t=0). Next, in Step S12, a processing (PB1=PB1$a$) is performed temporarily to maintain the servo hydraulic pressure at a predetermined pressure that is slightly lower than the line pressure. This processing, more specifically, refers to a processing in which a driving signal current value to the solenoid 1 of solenoid valve 41 is controlled so as to operate with pressure adjustment the solenoid valve 41, shown in FIG. 5, and the hydraulic pressure of the hydraulic servo is made PB1$a$ by the control valve 45 using the resultant solenoid pressure (the relationship between the driving signal and the servo pressure is almost the same in all hydraulic controls described hereafter). The processing is intended to prevent an increase in the engine speed caused by a variation in the activation of the C-1 clutch to be engaged due to individual differences and variations over the time of each shift. The time period in which a constant pressure is maintained is monitored in Step S13 until the judgement thereof is established (timer t>t_wait). After the timer time period has passed, a processing (PB1=PB1$c$) for starting release of the B-1 brake is performed to suddenly reduce the servo hydraulic pressure to a predetermined pressure in Step S14. Subsequently, while the processing is performed to gradually reduce the servo hydraulic pressure (sweeping-down at a gradient of dPB1$c$) in Step S15, the degree of the progress (Shift R) as an index for judging the progress of the shift is judged in the next Step S16. For the degree of the progress (Shift R) of the shift, an input shaft speed or the hydraulic pressure of the hydraulic servo may be used as the judgement index. However, in this embodiment, the input and output shafts' speeds are used as indices and expressed by Shift R=(transmission input speed−gear ratio before shifting×transmission output speed)×100/{transmission output speed×(gear ratio after shifting−gear ratio before shifting)} [%]. For example, Shift R is set at 70% and calculated based on values detected by the transmission input shaft speed sensor 33 and the vehicle speed sensor 34. Because the judgement of the degree of the progress is not initially established, a loop to return to Step S15 is repeated. Thus, when the degree of the progress is established (Shift R>S_End 2) in Step S16, a depressurizing processing is performed to completely drain the servo hydraulic pressure of the B-1 brake in the next Step 17 (sweeping-down at a gradient of dPB1$d$). As the processing is automatically complete when the solenoid valve 3 has reached full output, the sixth-to-fourth speed control for releasing the B-1 brake is terminated without special monitoring or judgement.

Figure 7:
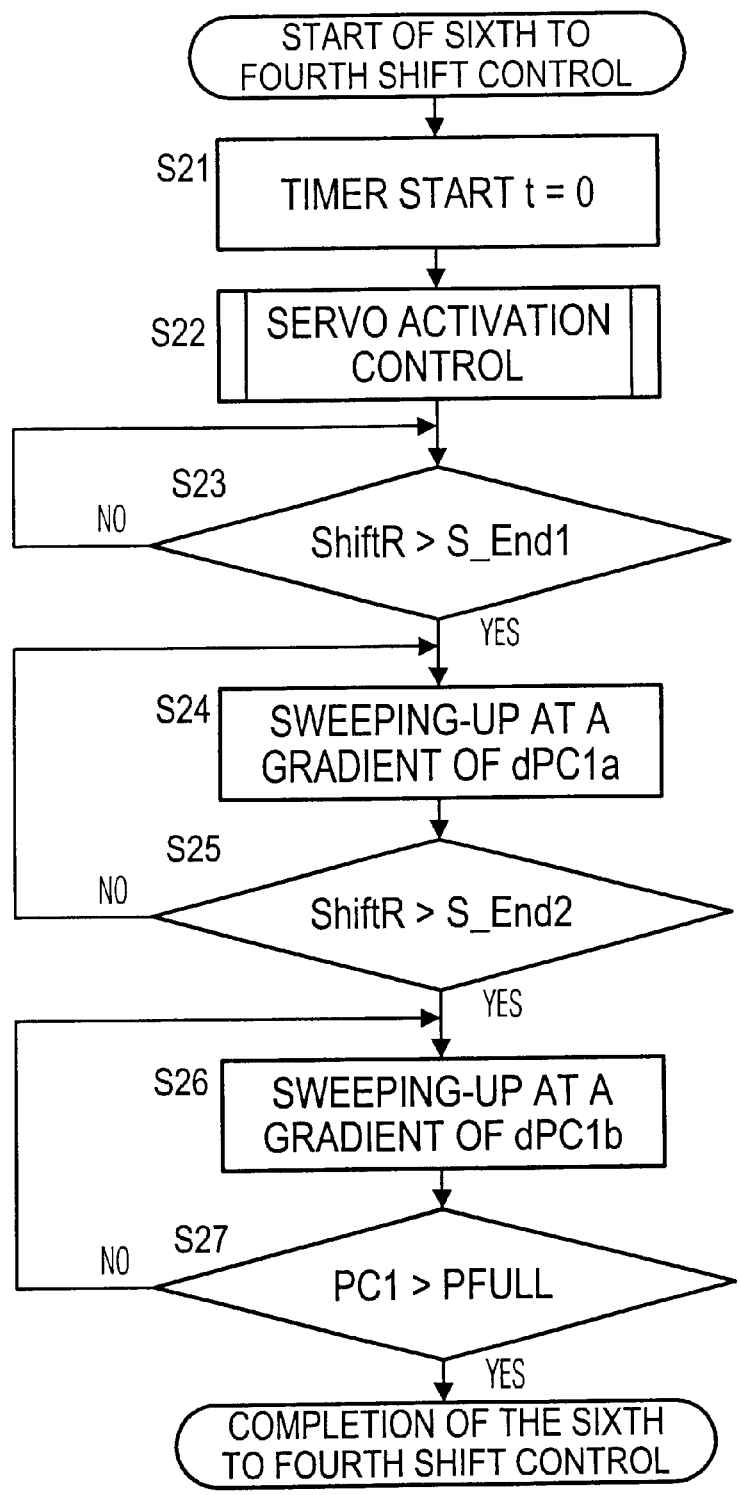
FIG. 7 is a flow chart showing the engagement control of the C-1 clutch at the time of the sixth to third shift.

Next, a control flow for engaging the C-1 clutch as the third engagement element to be engaged in this shift will be described with reference to FIG. 7. This control is set to start at the same time as the sixth-to-fourth speed control for controlling the engagement of the brake B-1 as previously described. Like in the previously described control, a timer is started in Step S21 (timer start t=0). Next, a servo activation control sub-routine processing is performed in Step S22. This processing is performed for maintaining a fast filling of the hydraulic pressure so as to fill a hydraulic servo cylinder of the C-1 clutch, and a subsequent piston stroke pressure for filling a gap between the hydraulic servo piston and the friction material of the engagement element, which is a known processing ordinarily performed for the engagement of clutches. Next, in Step S23, the degree of progress (Shift R) is judged (Shift R>S_End 1). As this judgement is not initially established (No), the judgement is continued until the judgement is established by the progressing shift. When the judgement is established (Yes), pressure boosting (sweeping-up at a gradient of dPC1$a$) for starting the engagement of the C-1 clutch is started in Step S24. While the pressure-boosting is continued, in the next Step S25, it is judged whether the shift has reached just before fourth speed synchronization, for example, 90% (Shift R>S_End 2) based on the degree of the progress (Shift R) of the shift. Because this judgement is also not initially established, a loop to return to Step S24 is continued until the judgement is established by the progressing shift. When the judgement in Step S25 is established, a processing is performed for boosting the pressure to the line pressure so as to reliably ensure maintaining the engagement of the C-1 clutch (sweeping-up at a gradient of dPC1$b$) in Step 26. It is then repeatedly judged whether the servo hydraulic pressure has reached the line pressure (PC>P FULL) in Step S27. When the judgement in Step S27 is established (Yes), the sixth-to-fourth speed shift control for controlling the engagement of the C-1 clutch is completed.

Figure 8:
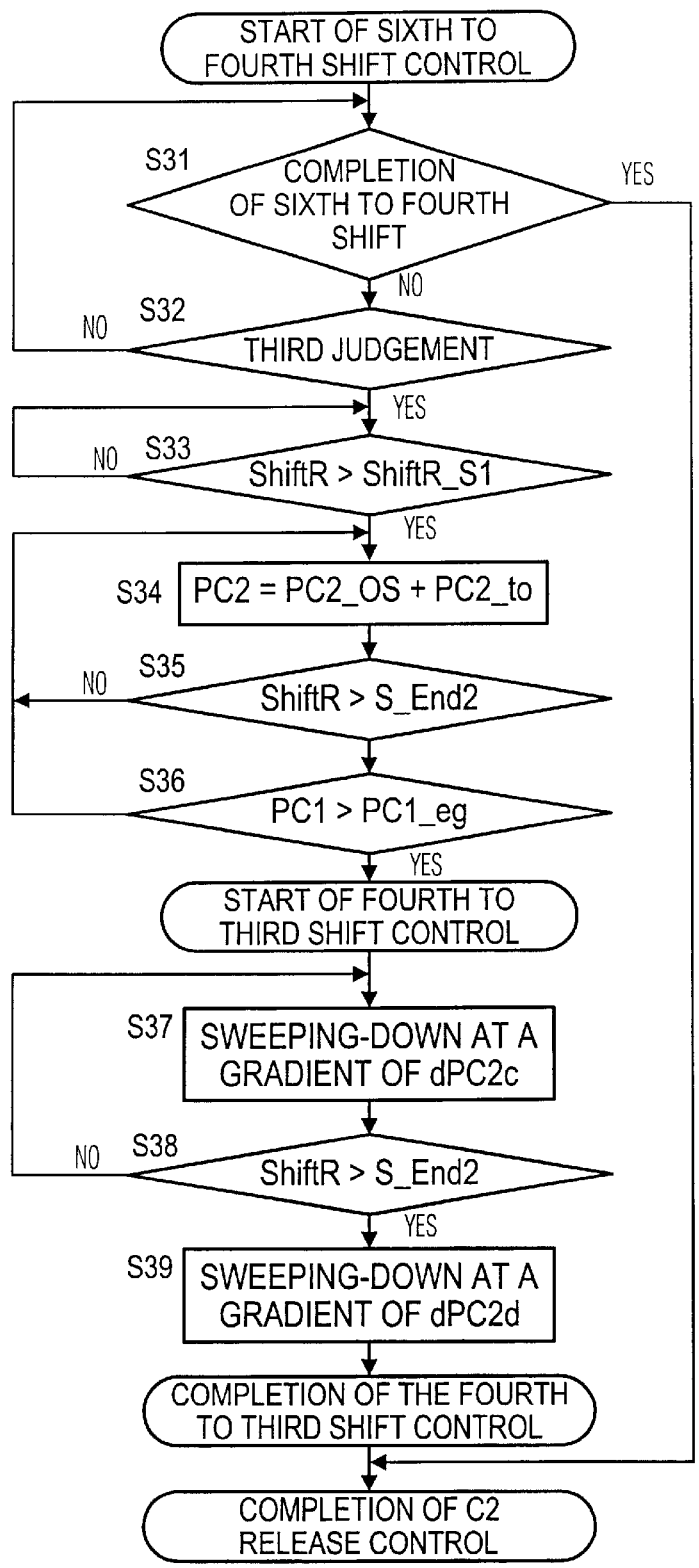
FIG. 8 is a flow chart showing the release control of the C-2 clutch at the time of the sixth to third shift.

Next, the control how tor releasing the C-2 clutch, as the second engagement element to be released, in addition to the release of the B-1 brake, will be explained with reference to FIG. 8. As a precondition of the processing, the sixth to fourth shift completion judgement is made in an initial Step S31, and when it is established, the following steps are skipped and the C-2 release control is terminated. This processing is intended to exclude a case where the sixth to fourth shift has already been completed, in which the C-2 release control is suited to the situation. Under this exclusion, judgement is made whether the shift command to third speed is established in the next Step S32 (the third judgement). Accordingly, discrimination with a shift to other gear speeds is made. As above, after implementation of this control is confirmed to be appropriate, a judgement of the degree of the progress (Shift R) of the shift for determining the timing of starting the release of the C-2 clutch is made in Step S33. When this judgement is established (Shift R>Shift $R_{13}$ S1), a depressurizing processing is performed to suddenly reduce the servo hydraulic pressure of the C-2 clutch to a predetermined hydraulic pressure in Step S34 (PC2=PC2__OS+PC2__to). In this case, the predetermined hydraulic pressure is set as a hydraulic pressure (PC2__to) suitable for the input torque to the C-2 clutch, increased by a hydraulic pressure (PC2__OS) as a safety factor that is at a ratio that is decreased in accordance with the progress of the shift.

In this case, an input torque can be obtained by multiplying an engine torque, obtained by a throttle opening, and an engine speed map and a speed ratio determined from the input speed and the output speed of the torque converter. Next, the input torque is converted to the hydraulic pressure by dividing by the product of piston receiving pressure area of the hydraulic servo, the number of friction materials, the effective radius, and the friction coefficient for the hydraulic pressure servo for the corresponding engagement element. To this value is then added the piston stroke pressure. However, in this case, the hydraulic pressure (PC2__OS) for the safety coefficient is decreased in accordance with the progress of the shift. As explained above, while the depressurizing processing is performed, a judgement is made about the degree of progress (Shift R) of the shift for determining the period immediately before fourth speed synchronization in the next Step S35. When the period immediately before synchronization judgement (Shift R>S__End 2) is established, it is judged whether the servo hydraulic pressure (PC1) of the C-1 clutch exceeds the hydraulic pressure (PC1__eg) required for maintaining the engagement thereof with respect to the input torque in Step S36. Meanwhile, the input torque in this judgement is calculated as described above. The establishment by the judgement means that fourth speed is completely achieved, results in entry into the fourth to third shift control (fourth to third shift control start).

In the fourth to third shift control, while a processing is performed to sweep down the servo pressure (PC2) of the C-2 clutch at a gradient of dPC2c in the initial Step S37, a judgement is made about the degree of progress (Shift R) of the fourth to third shift in Step S38. Then, the sweeping-down continues until the judgement is established. Next, when the judgement is established, a depressurizing processing (sweeping-down at a gradient of dPC2d) is performed so as to completely drain the servo hydraulic pressure of the C-2 clutch in Step S39. This processing is also automatically completed when the solenoid valve 2 of the solenoid valve 42 reaches full output. Therefore, the fourth to third shift control for releasing the C-2 clutch is completed without specifically monitoring or a judgement being made. Accordingly, the C-2 release control is completed.

Next, according to the purpose of the invention, a control flow for engaging the C-3 clutch as the fourth engagement element for which the engagement control is started to be activated at the sixth to fourth shift stage will be explained with reference to FIGS. 9A and 9B. Also in this case, as a precondition of this processing, the sixth to fourth shift completion judgement is made in an initial Step S41, and when it is established the following steps are skipped and the C-3 engagement control is terminated. This processing is intended to exclude a case where the sixth to fourth shift has already been completed, in which the C-3 engagement control is suited to the situation. Under this exclusion, a judgement is made whether the shift command to third speed is established in the next Step S42 (the third judgement). Accordingly, discrimination from a shift to other gear speeds is made. As above, after implementation of this control is confirmed to be appropriate, a judgement of the degree of the progress (Shift R) of the sixth to fourth shift is started in Step S43. (Shift R__S2) as a degree of progress (Shift R) judging index in this case is set as a timing to confirm the draining of the initial pressure from the hydraulic servo 62 of the C-2 clutch, i.e., to confirm that the processing of the Step S43 has been accomplished. When this judgement of the degree of progress is established (Shift R>Shift R__S2), a servo activation control 1 sub-routine processing is performed in the next Step S44. This processing is performed for fast filling the hydraulic pressure to fill the hydraulic servo cylinder of the C-3 clutch and for maintaining a subsequent piston stroke pressure between the hydraulic servo piston and the friction material of the engagement element. The processing is like that of the activation of the C-1 clutch, but the setting of the piston stroke pressure differs from the case of activation of the C-1 clutch. The setting of the hydraulic pressure will be explained in detail later in the applicable step.

The timing of the servo activity will be further explained. At the time of the fast filling, unlike the hydraulic control for maintaining the low pressure or boosting up, a large amount of oil needs to be supplied to fill the servo cylinder. Therefore, even if the activation of the C-3 clutch is made earlier so as to establish the engagement stand-by state of the C-3 clutch early on, when the activation is overlapped with the activation of the C-1 clutch, oil is supplied to the two hydraulic servos at the same time. Therefore, a load greater than the discharge capacity of the oil pump as the hydraulic pressure supply source is supplied, which delays the activation of both clutches. Therefore, an appropriate timing of the first activation timing of the C-3 clutch is after completion of the activation of the C-1 clutch when the capacity load of the oil pump is reduced. Further, merely in terms of timing, it is desirable to avoid an initial period after the start of the shifting where it is still possible that a shift command may be changed to a transmission to another gear speed. Therefore, an appropriate timing for the second activation timing of the C-3 clutch is after the sixth to fourth shift has progressed to some extent. In terms of the pressure load, while the sixth to fourth shift progresses, release of the B-1 brake progresses and the C-1 clutch is on stand-by for the engagement. Therefore, the pressure in the hydraulic servos 63, 61 for the B-1 brake and the C-1 clutch is low. On the contrary, the C-2 clutch is loaded with a line pressure supply while engaged, and therefore the pressure load of the hydraulic servo 62 is large. Therefore, an appropriate timing for the third activation of the C-3 clutch is after the drain of the pressure due to the start of the release control of the C-2 clutch. Under these circumstances, in this embodiment, the degree of the progress (Shift R__S2) of the shift is set as the activation timing of the C-3 clutch.

Meanwhile, a clutch, unlike a brake, incorporates a centrifugal hydraulic servo in a drum that is rotating, and therefore, centrifugal hydraulic pressure is generated in the oil in the hydraulic servo. Because the centrifugal hydraulic pressure varies the supply pressure, thereby deteriorating the controllability of the clutch, as an effective countermeasure to counterbalance the action of the centrifugal hydraulic pressure, a canceling chamber is provided. If it is assumed that a canceling chamber is installed in the C-3 clutch, in the gear train according to the embodiment, the drum of the C-3 clutch is in a stopped condition in a state where sixth speed is achieved initially after the start of the transmission, thus the oil in the canceling chamber is drained. When the piston stroke pressure after the activation of the hydraulic servo of the C-3 clutch is set at an ordinary engagement stand-by state in this state, the piston stroke becomes excessive in the engagement stand-by state of the C-3 clutch, and there is a concern that the state enters a slipping state at the start of engagement. Therefore, according to the embodiment, a correction for this purpose is performed in the servo activation control 1.

Figure 10:
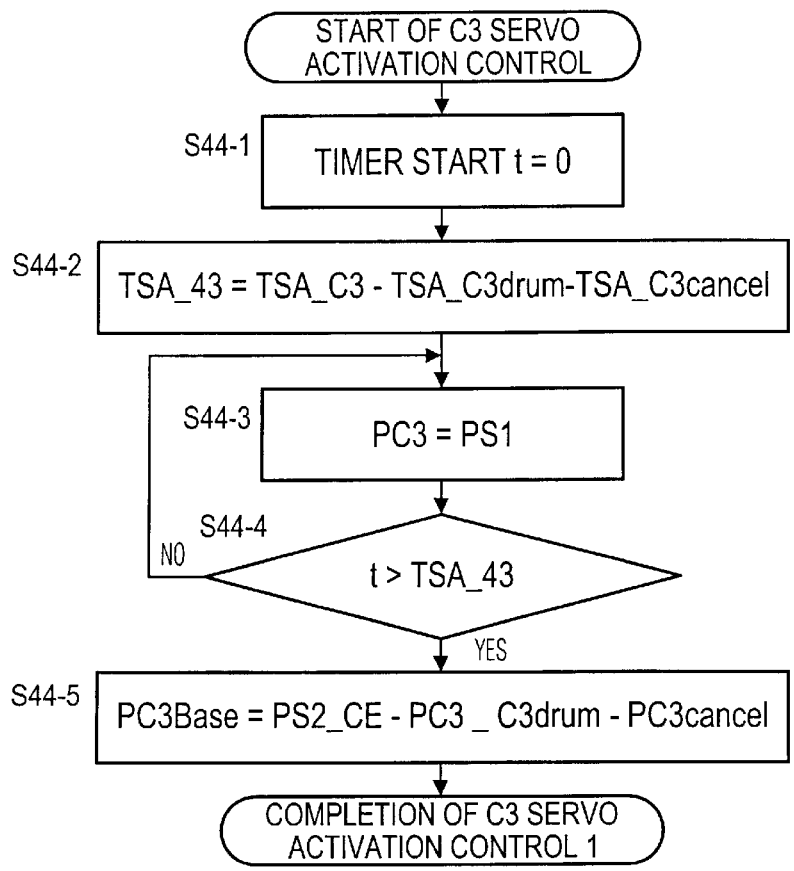
FIG. 10 is a flow chart showing the activation control of the C-3 brake at the time of the sixth to third shift.
Figure 11:
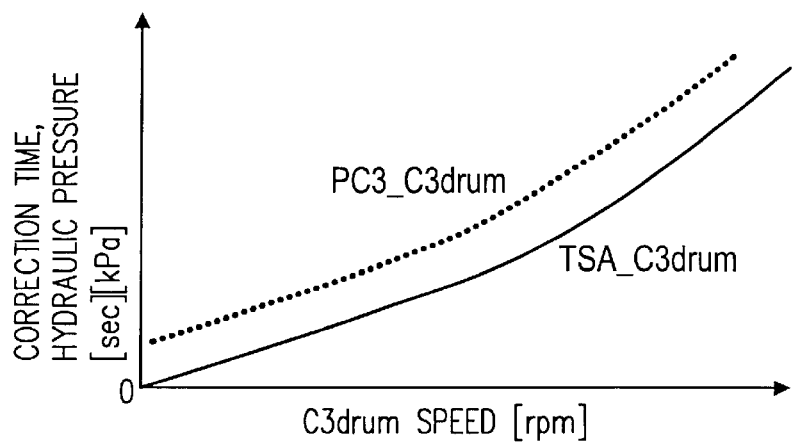
FIG. 11 is a graph showing correction characteristics of the hydraulic pressure and the control time when the activation of the C-3 clutch is controlled at the time of the sixth to third shift.
Figure 12:
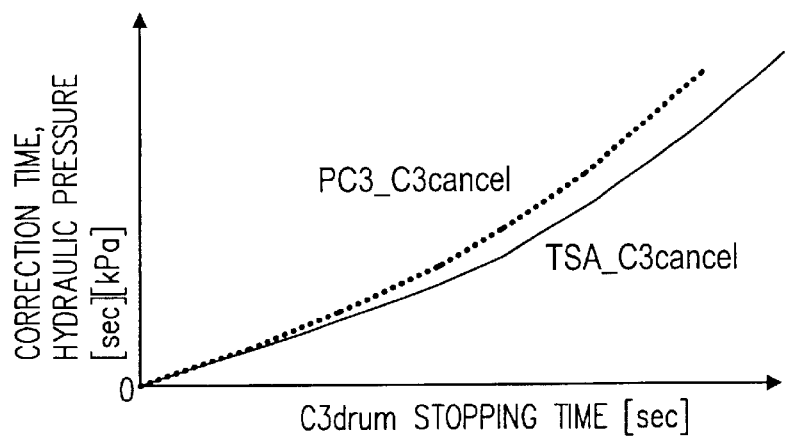
FIG. 12 is a graph showing correction characteristics of a base stand-by hydraulic pressure after the activation of the C-3 clutch is controlled at the time of the sixth to third shift.

FIG. 10 shows a sub-routine flow of the servo activation control 1. This control is designed to set the fast filling period and the subsequent stand-by pressure from the correlation between the stopping time and revolution of the drum. First, the timer is started in an initial Step S44-1 (timer start t=0). Next, a processing is performed to set the fast filling period (TSA_43) in Step S44-2. In this case, TSA_43 is set as:

TSA_43=TSA_C3−TSA_C3 drum−TSA_C3 cancel;

where TSA_C3 is a piston stroke time required for an ordinary fourth to third shift, TSA_C3 drum is a correction time set based on the revolution of the drum of the C-3 clutch, and TSA_C3 cancel is a correction time set based on the stopping time of the drum of the C-3 clutch. A relationship, as shown in FIG. 11 by the solid line, is established between the revolution of the drum of the C-3 clutch and the correction time. In addition, a correlation, as shown in a solid line in FIG. 12, is established between the stopping time of the drum of the C-3 clutch and the correction time. In the next Step S44-3, processing is performed to set the servo pressure PC3 to the supply pressure PS1 for fast filling. Subsequently, passage of the time for the fast filling time is awaited in Step S44-4 (t>TSA_43). In addition, when the completion of the fast filling is confirmed by the judgement, processing is performed to set a base pressure (PC3Base) in the next Step S44-5. The base pressure (PC3Base) in this case is set as follows:

PC3Base=PS2_C3−PC3_C3drum−PC3cancel;

where PS2_C3 is a piston stroke pressure required for an ordinary fourth to third shift, PC3_C3drum is a correction hydraulic pressure set based on the revolution of the drum, and PC3cancel is a correction hydraulic pressure based on the stopping time of the drum of the C-3 clutch. A correlation, as shown by a dashed line in FIG. 11, is established between the revolution of the drum of the C-3 clutch and the correction hydraulic pressure. In addition, a correlation, as shown by a dashed line in FIG. 12, is established between the stopping time of the drum of the C-3 clutch and the correction hydraulic pressure. The processing of the C3 servo activation control 1 is terminated by the setting of the base pressure.

Figure 9A:
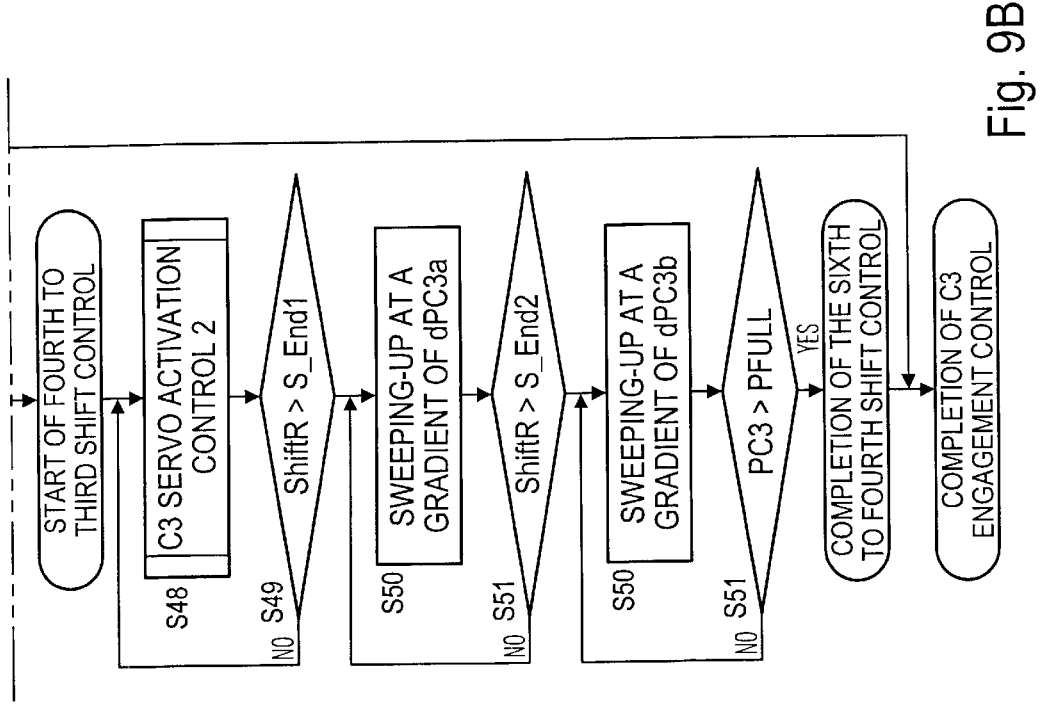
FIG. 9 is a flow chart showing the engagement control of the C-3 brake at the time of the sixth to third shift.
Figure 9B:
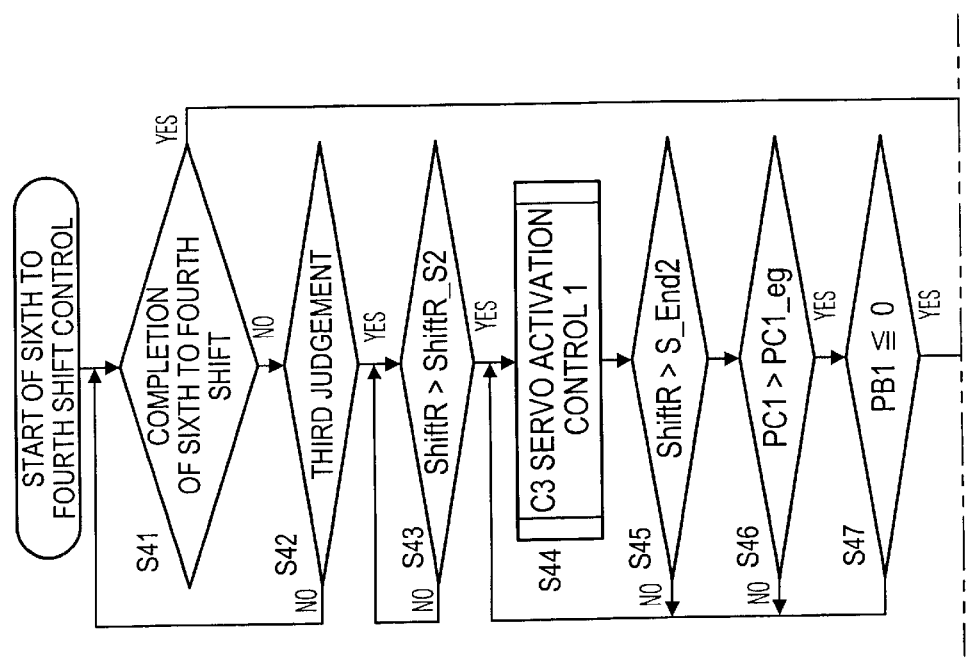

Returning to the control flow shown in FIGS. 9A and 9B, the degree of the progress (Shift R) of the shift is judged in Step S45 after the servo activation control 1 (Shift R>S_End 2). As this judgement is not initially established (No), maintenance of the base pressure by the C3 servo activation control 1 is continued until the judgement is established by the progressing shift. When the aforementioned judgement is established (Yes), a judgement whether the engagement of the C-1 clutch is achieved is made based on whether the servo pressure of the C-1 clutch exceeds a hydraulic pressure suitable for the input torque (PC_eg). Further, a judgement is made whether the release of the servo pressure (PB1) of the B-1 brake is completed (Pb1≦0) in the next Step 47. Accordingly, a condition exits where the base pressure (PC3Base) is maintained by the servo activation control 1 until all the above judgements are established. Upon establishment of all of the judgements, the fourth to third shift control is started.

Figure 13:
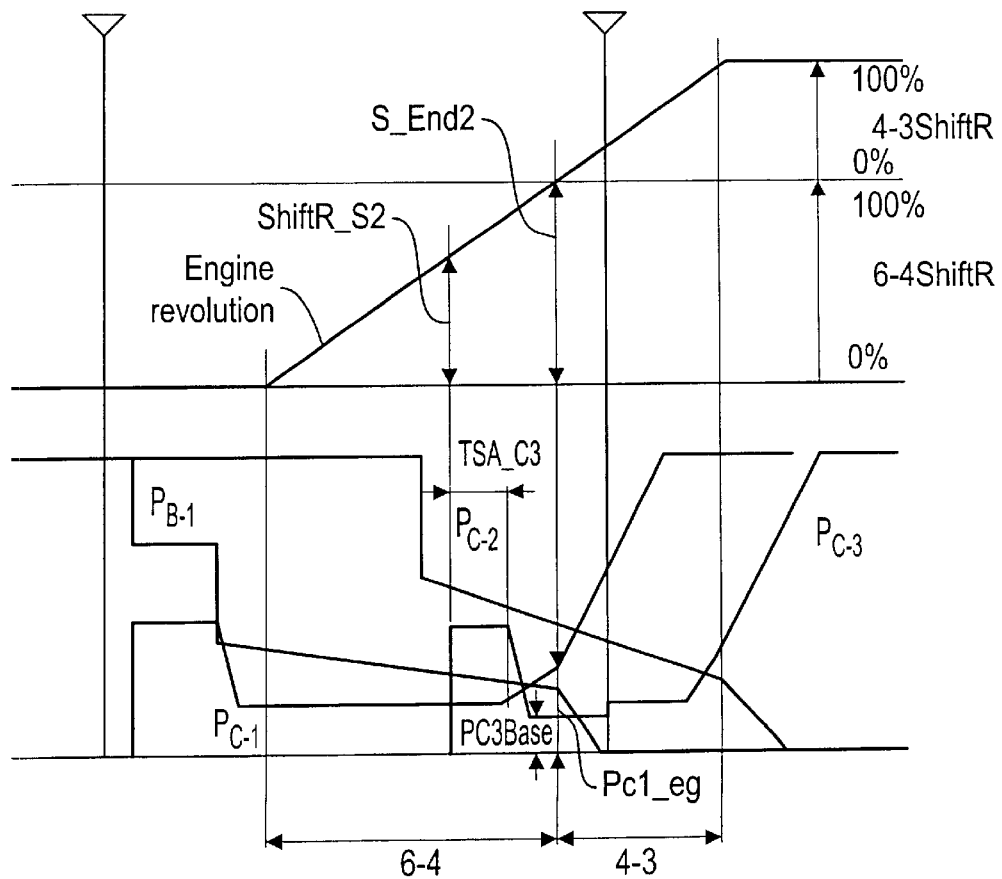
FIG. 13 is a time chart showing a relationship for controlling each engagement element at the time of the sixth to third shift.

In the fourth to third shift control, a processing of a C3 servo stand-by control 2 is performed in Step S48. This processing of the C3 servo stand-by control 2, as shown in detail in FIG. 13, is a process (PC3Base=PS2_C3) to change the state of maintaining the base pressure (PC3Base) to the state of maintaining the original stand-by pressure. Thus, with the normal stand-by pressure (PC2_C3) maintained, a judgement (Shift R>S_End 1) about the degree of progress (Shift R) of the shift is made in Step S49. When the judgement is established, a boosting (sweeping-up at a gradient of dPC3a) is started for starting the engagement of the C-3 clutch in Step S50. Further, while this boosting is continued, a judgement is made as to whether the shift has reached third speed synchronization (Shift R>S_End 2) based on the degree of the progress (Shift R) of the shift in the next Step S51. This judgement is not initially established either, so a loop to return to Step S50 is repeated until the judgement is established by the progressing shift, and sweeping-up is continued. Establishment of the judgement in Step S51 means completion of the engagement of the C-3 clutch. Thus, in Step S52, while a processing is being performed to boost pressure to the line pressure (sweeping-up at a gradient of dPC3b) to reliably maintain engagement of the C-3 clutch at this time, a judgement as to whether the servo hydraulic pressure has reached the line pressure (PC1>P FULL) is repeated in the next Step S53. In this way, when the judgement in Step S53 is established, the sixth to third shift control for the engagement control of the C-3 clutch is terminated.

Operation of the four engagement elements by the aforementioned sixth to third shift control is shown in the time chart of FIG. 13 with respect to the relationship between the servo hydraulic pressure and the input shaft speed. As shown in the figure, the release control of the B-1 brake and the engagement control of the C-1 clutch are started at the same time upon the establishment of the sixth to third shift command. At the same time when the servo hydraulic pressure of the C-1 clutch is boosted to the fast filling pressure, the servo hydraulic pressure of the B-1 brake is temporarily reduced to a pressure slightly lower than the line pressure, and then reduced to a predetermined pressure for starting the release. Accordingly, the sixth to fourth shift is started as described earlier, and the input shaft speed begins to increase. Next, the servo hydraulic pressure of the B-1 brake is reduced for the start of the release at a constant gradient. The servo hydraulic pressure of the C-1 clutch is maintained at the piston stroke pressure, and the C-1 clutch is in an engagement stand-by state.

Next, due to the increase in the input shaft speed, when the timing has come for starting the release control of the C-2 clutch, the servo hydraulic pressure of the C-2 clutch is suddenly reduced to a pressure which does not lead to a start of the release (slip), and then reduced at a certain gradient. Immediately after the release control of the C-2 clutch is started, the engagement control of the C-3 clutch is started so that its initial activation control, in other words, a boosting to the fast filling pressure is performed. Subsequently, the pressure is reduced to the base pressure (PC3Base) and maintained thereat. On the other hand, the sixth to fourth shift to fourth speed synchronization progresses. When a judgement of 70%, before fourth speed synchronization (S_End 1) is established from the input shaft speed, the servo hydraulic pressure of the C-1 clutch is increased and the engagement (slip) of the C-1 clutch progresses. Subsequently, when the C-1 clutch has reached 90%, before the completion of the engagement of the C-1 clutch, the judgement of immediately before fourth speed synchronization based on the input shaft speed (S_End 2) is established. Therefore, the servo hydraulic pressure of the C-1 clutch is switched to the boosted condition of the line pressure. At this stage, the servo pressure of the C-3 clutch is increased to the original standby pressure and maintained. On the other hand, the servo hydraulic pressure of the C-2 clutch, while under the depressurizing control, is controlled such that it becomes a hydraulic pressure suitable for reaching the start of the release when the judgement of fourth speed synchronization (S_End 2) is established due to depressurizing control thereof. Therefore, the start of boosting the servo hydraulic pressure of the C-3 clutch at this time starts the engagement of the C-3 clutch as well as the release of the C-2 clutch. Accordingly, when the fourth to third shift progresses so as to reach third speed synchronization, the servo hydraulic pressure of the C-2 clutch is completely released, and the servo hydraulic pressure of the C-3 clutch is boosted to the line pressure. As above, the sixth-to-third shift is realized in an embodiment of the successive sixth-to-fourth-to-third shifts.

Figure 14:
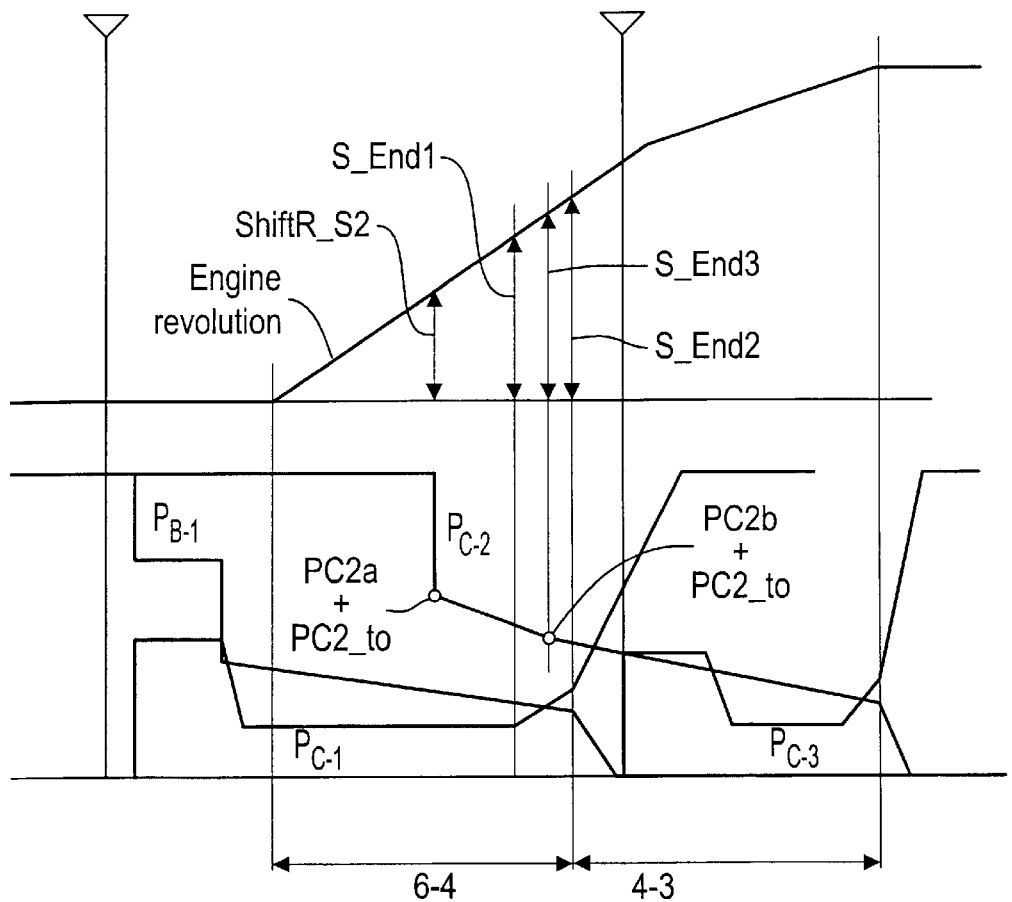
FIG. 14 is a time chart showing a relationship for controlling each engagement element at the time of the sixth-to-fourth-to-third shift.

Further, in contrast to the aforementioned sixth-to-fourth-to-third shift, FIG. 14 shows a time chart when the engagement control of the C-3 clutch is started at the time when fourth speed synchronization is confirmed. In the time chart as shown in FIG. 14, a period is required for activating the C-3 clutch after fourth speed synchronization. Thus, for the period from when the activation is terminated until the servo pressure of the C-3 clutch is maintained and stabilized at the stand-by pressure, it is necessary to prevent the generation of slip due to a reduction of the servo pressure of the C-2 clutch. Therefore, the sweeping-down gradient of the servo pressure of the C-2 clutch is set to be milder when the degree of the shift (Shift R) becomes S_End 3. Further, it is understood, as seen from the change of the input shaft speed in the upper level of the figure, the fourth-to-third shift period, that is, the latter half of the sixth-to-third shift, becomes longer, which is a factor in prolonging the entire shift time. The substantial shift period in this case is the sum of the periods as shown by a double ended arrow 6-4 and a double ended arrow 4-3. As seen from this contrast, the advantage of the invention is that the need to prolong the reduction in the servo pressure of the C-2 clutch for waiting for the activation of the C-3 clutch is eliminated.

In this way, according to the shift control apparatus in the above embodiment, it is possible to advance the activation of the subsequent C-3 clutch with respect to the preceding C-1 clutch. Therefore, the timing for starting the engagement of the C-3 clutch is moved to the side of the timing when the first stage changeover is achieved, thereby allowing the transfer from the first stage changeover to the second stage changeover to be advanced. Accordingly, a shift can be achieved that does not give a driver the feeling of a stage change while a two-stage shift operation is performed. In other words, in the shift from sixth speed to fourth speed, activation of the C-3 clutch can be completed. Accordingly, it is possible to shift the timing of starting the engagement of the C-3 clutch to the side of the timing when fourth speed is achieved, and advance the transfer from fourth speed to third speed. With this arrangement, a shift can be achieved that does not give a driver a feeling of a stage change while the shift operation through fourth speed is performed.

Further, because a shift like this is controlled by the hydraulic pressure of the hydraulic servo in accordance with the degree of the progress (Shift R) of the shift with a change of the input speed as an index, the four engagement elements can be controlled in an orderly sequence without relying on a complicated feed back control. As a result, a complicated shift involving four engagement elements can be achieved with a simple control.

Further, timings are set for the hydraulic servos of the C-2 clutch and the C-3 clutch, such that activation for each, that is, fast filling operation, does not overlap. Therefore, the hydraulic supply load is prevented from becoming overloaded, and the fast filling operations for both the C-2 clutch and C-3 clutch are performed quickly. Accordingly, the transfer to the stand-by state is advanced.

In addition, after the hydraulic pressure of the hydraulic servo of the C-2 clutch is released, the supply of the hydraulic pressure to the hydraulic servo of the C-3 clutch is started. Therefore, the C-3 clutch is activated in a state where the hydraulic supply load is decreased. Thus, the activation of the C-3 clutch is quickened.

Further, a situation in which the C-3 clutch inadvertently starts engagement while the engagement of the C-1 clutch is progressing and the C-3 clutch is tied up with the C-2 clutch to be changed over therewith, can be prevented by a state of the transmission mechanism, in other words, by setting of the base pressure with corrected action of the centrifugal hydraulic pressure by the residual pressure remaining in the canceling chamber. Therefore, the tie up due to advancement of the engagement of the C-3 clutch can also be reliably prevented.

As above, the invention has been explained referring to a typical embodiment in a certain gear train, however, the spirit of the invention is not limited to the gear train as exemplified, but is applicable to all gear trains where a relationship between engagement and release between the engagement elements becomes a changeover of two elements at the same time in a transmission involving four engagement elements.

What is claimed is:

1. A shift control apparatus for an automatic transmission which requires activation of four engagement elements during a shift from a first gear speed to a second gear speed, in which the first gear speed is achieved by engagement of first and second engagement elements and the second gear speed is achieved by engagement of third and fourth engagement elements, wherein the control apparatus comprises shift control means for starting an engagement control of the fourth engagement element after a start of an engagement control including that of activation of the third engagement element and before a start of an engagement of the third engagement element; the shift control means activates the fourth engagement element after completion of activating the third engagement element; and the activation of the third and fourth engagement elements is a fast filling operation for stroking a piston by supplying the hydraulic pressures to the hydraulic servos therefore.

2. The shift control apparatus of an automatic transmission according to claim 1, wherein the shift control means comprises judgement means for judging a degree of progress of a shift with a change in input speed as an index, and the engagement control of the third and fourth engagement elements is performed based on the judgement of the degree of progress of the shift by the judgement means.

3. The shift control apparatus of an automatic transmission according to claim 2, wherein the third and fourth engagement elements are controlled by hydraulic pressures in hydraulic servos therefore, and the engagement control by the shift control means activates the third and fourth engagement elements by supplying the hydraulic pressure to the hydraulic servos therefore and starts the engagement by an increase of the hydraulic pressures.

4. The shift control apparatus of an automatic transmission according to claim 3, wherein the activation of the third and fourth engagement elements is a fast filling operation for stroking a piston by supplying the hydraulic pressures to the hydraulic servos therefore.

5. The shift control apparatus of an automatic transmission according to claim 3, wherein the second engagement element is controlled by a hydraulic pressure of a hydraulic servo therefore, and the shift control means activates the fourth engagement element after starting a release control of the second engagement element.

6. The shift control apparatus of an automatic transmission according to claim 3, wherein the shift control means comprises activation control means for maintaining the hydraulic pressures of the hydraulic servos therefore at a base pressure so as to prevent a start of the engagement of the fourth engagement element for a period after the activation control means activates the fourth engagement element until at least the third engagement element completes engagement.

7. The shift control apparatus of an automatic transmission according to claim 6, wherein the activation control means regulates an activation time and the base pressure in accordance with a state of a transmission mechanism.

8. The shift control apparatus of an automatic transmission according to claim 6, wherein the shift control means maintains the hydraulic pressure of the hydraulic servo for the fourth engagement element at a stand-by pressure immediately before the start of the engagement after completion of the engagement of the third engagement element.

9. A shift control apparatus for an automatic transmission which requires activation of four engagement elements during a shift from a first gear speed to a second gear speed, in which the first gear speed is achieved by engagement of first and second engagement elements and the second gear speed is achieved by engagement of third and fourth engagement elements, wherein the control apparatus comprises shift control means for starting an engagement control of the fourth engagement element after a start of an engagement control including that of activation of the third engagement element and before a start of an engagement of the third engagement element; the third and fourth engagement elements are controlled by hydraulic pressures in hydraulic servos therefore, and the engagement control by the shift control means activates the third and fourth engagement elements by supplying the hydraulic pressure to the hydraulic servos therefore; the shift control means comprises activation control means for maintaining the hydraulic pressures of the hydraulic servos therefore at a base pressure so as to prevent a start of the engagement of the fourth engagement element for a period after the activation control means activates the fourth engagement element until at least the third engagement element completes engagement; and the shift control means maintains the hydraulic pressure of the hydraulic servo for the fourth engagement element at a stand-by pressure immediately before the start of the engagement after completion of the engagement of the third engagement element.

10. A control apparatus for an automatic transmission which requires activation of four engagement elements during a shift from a first gear speed to a second gear speed, in which the first gear speed is achieved by engagements of first and second engagement elements, a transient gear speed is achieved by engagements of the second engagement element and a third engagement element, and the second gear speed is achieved by engagements of the third engagement element and a fourth engagement element, wherein the control apparatus comprises shift control means for starting an engagement control of the fourth engagement element in the middle of a shift from the first gear speed to the transient gear speed; the third and fourth engagement elements are controlled by hydraulic pressures in hydraulic servos therefore, and the engagement control by the shift control means activates the third and fourth engagement elements by supplying the hydraulic pressure to the hydraulic servos therefore; the shift control means comprises activation control means for maintaining the hydraulic pressures of the hydraulic servos therefore at a base pressure so as to prevent a start of the engagement of the fourth engagement element for a period after the activation control means activates the fourth engagement element until at least the third engagement element completes engagement; and the shift control means maintains the hydraulic pressure of the hydraulic servo for the fourth engagement element at a stand-by pressure immediately before the start of the engagement after completion of the engagement of the third engagement element.

11. A control apparatus for an automatic transmission which requires activation of four engagement elements during a shift from a first gear speed to a second gear speed, in which the first gear speed is achieved by engagements of first and second engagement elements, a transient gear speed is achieved by engagements of the second engagement element and a third engagement element, and the second gear speed is achieved by engagements of the third engagement element and a fourth engagement element, wherein the control apparatus comprises shift control means for starting an engagement control of the fourth engagement element in the middle of a shift from the first gear speed to the transient gear speed, the shift control means activates the fourth engagement element after completion of activating the third engagement element; and the activation of the third and fourth engagement elements is a fast filling operation for stroking a piston by supplying the hydraulic pressures to the hydraulic servos therefore.

12. The shift control apparatus of an automatic transmission according to claim 11, wherein the shift control means comprises judgement means for judging a degree of progress of a shift with a change in input speed as an index, and the engagement control of the third and fourth engagement elements is performed based on the judgement of the degree of progress of the shift by the judgement means.

13. The shift control apparatus of an automatic transmission according to claim 12, wherein the third and fourth engagement elements are controlled by hydraulic pressures in hydraulic servos therefore, and the engagement control by the shift control means activates the third and fourth engagement elements by supplying the hydraulic pressure to the hydraulic servos therefore and starts the engagement by an increase of the hydraulic pressures.

14. The shift control apparatus of an automatic transmission according to claim 13, wherein the shift control means activates the fourth engagement element after completion of activating the third engagement element.

15. The shift control apparatus of an automatic transmission according to claim 14, wherein the activation of the third and fourth engagement elements is a fast filling operation for stroking a piston by supplying the hydraulic pressures to the hydraulic servos therefore.

16. The shift control apparatus of an automatic transmission according to claim 13, wherein the second engagement element is controlled by a hydraulic pressure of a hydraulic servo therefore, and the shift control means activates the fourth engagement element after starting a release control of the second engagement element.

17. The shift control apparatus of an automatic transmission according to claim 13, wherein the shift control means comprises activation control means for maintaining the hydraulic pressures of the hydraulic servos therefore at a base pressure so as to prevent a start of the engagement of the fourth engagement element for a period after the activation control means activates the fourth engagement element until at least the third engagement element completes engagement.

18. The shift control apparatus of an automatic transmission according to claim 17, wherein the activation control means regulates an activation time and the base pressure in accordance with a state of a transmission mechanism.

19. The shift control apparatus of an automatic transmission according to claim 17, wherein the shift control means maintains the hydraulic pressure of the hydraulic servo for the fourth engagement element at a stand-by pressure immediately before the start of the engagement after completion of the engagement of the third engagement element.

* * * * *